United States Patent
Nakano et al.

(10) Patent No.: US 10,091,521 B2
(45) Date of Patent: Oct. 2, 2018

(54) IMAGE ENCODING DEVICE, CAPTURED IMAGE RECORDING SYSTEM, IMAGING DEVICE, METHOD OF ENCODING IMAGE, AND IMAGE ENCODING PROGRAM

(71) Applicant: Panasonic Intellectual Property Management Co., Ltd., Osaka (JP)

(72) Inventors: Satoshi Nakano, Fukuoka (JP); Mari Yasuda, Fukuoka (JP); Tetsuo Tanaka, Fukuoka (JP); Jun Ikeda, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 625 days.

(21) Appl. No.: 14/427,931

(22) PCT Filed: Sep. 17, 2013

(86) PCT No.: PCT/JP2013/005485
§ 371 (c)(1),
(2) Date: Mar. 12, 2015

(87) PCT Pub. No.: WO2014/050015
PCT Pub. Date: Apr. 3, 2014

(65) Prior Publication Data
US 2015/0229941 A1  Aug. 13, 2015

(30) Foreign Application Priority Data

Sep. 26, 2012 (JP) .................................. 2012-212054

(51) Int. Cl.
*H04N 7/12* (2006.01)
*H04N 11/02* (2006.01)
(Continued)

(52) U.S. Cl.
CPC .......... *H04N 19/46* (2014.11); *H04N 19/115* (2014.11); *H04N 19/124* (2014.11); *H04N 19/14* (2014.11);
(Continued)

(58) Field of Classification Search
None
See application file for complete search history.

(56) References Cited

U.S. PATENT DOCUMENTS

| 5,416,521 A | 5/1995 | Chujoh et al. |
| 6,763,138 B1 * | 7/2004 | Yokoyama ........... H04N 19/115 375/E7.134 |

(Continued)

FOREIGN PATENT DOCUMENTS

| CN | 101771875 A | 7/2010 |
| JP | 05-336511 A | 12/1993 |

(Continued)

OTHER PUBLICATIONS

Extended European Search Report dated Sep. 8, 2015, for corresponding EP Application No. 13842957.6-1908 / 2903271, 8 pages.
(Continued)

*Primary Examiner* — Sath V Perungavoor
*Assistant Examiner* — Xiaolan Xu
(74) *Attorney, Agent, or Firm* — Seed IP Law Group LLP

(57) ABSTRACT

To provide an image encoding device that can record desired hours of encoded data in a recording medium having a predetermined storage capacity, in a VBR encoding system. An image encoding device includes an image encoding unit that encodes a plurality of sequentially input images to generate a plurality of encoded data that configures video data, an average image complexity calculation unit that calculates average image complexity of complexity of the input images in a fluctuation cycle, based on the plurality of (Continued)

encoded data, and a code amount control unit that controls a code amount of the encoded data generated in the image encoding unit based on the average image complexity.

23 Claims, 9 Drawing Sheets

(51) Int. Cl.
    *H04N 11/04*     (2006.01)
    *H04N 19/46*     (2014.01)
    *H04N 19/115*     (2014.01)
    *H04N 19/14*     (2014.01)
    *H04N 19/177*     (2014.01)
    *H04N 19/169*     (2014.01)
    *H04N 19/124*     (2014.01)
    *H04N 19/146*     (2014.01)
    *H04N 19/61*     (2014.01)

(52) U.S. Cl.
    CPC ......... *H04N 19/146* (2014.11); *H04N 19/169* (2014.11); *H04N 19/177* (2014.11); *H04N 19/61* (2014.11)

(56) References Cited

U.S. PATENT DOCUMENTS

| | | |
|---|---|---|
| 2007/0147498 A1 | 6/2007 | Tanaka et al. |
| 2009/0135902 A1 | 5/2009 | Nakagomi et al. |
| 2010/0172410 A1 | 7/2010 | Wada et al. |

FOREIGN PATENT DOCUMENTS

| | | |
|---|---|---|
| JP | 10-164577 A | 6/1998 |
| JP | 3508916 B2 | 3/2004 |
| JP | 2005-151485 A | 6/2005 |
| JP | 2007-074634 A | 3/2007 |
| JP | 2009-130810 A | 6/2009 |

OTHER PUBLICATIONS

Chinese Office Action and English Translation of Search Report, dated May 17, 2017, for corresponding Chinese Application No. 201380050218.1, 11 pages.

International Search Report dated Dec. 17, 2013, for corresponding International Application No. PCT/JP2013/005485, 9 pages.

* cited by examiner

IMAGE ENCODING DEVICE, CAPTURED IMAGE RECORDING SYSTEM, IMAGING DEVICE, METHOD OF ENCODING IMAGE, AND IMAGE ENCODING PROGRAM

RELATED APPLICATION

The present application claims priority to Patent Application No. 2012-212054, filed on Sep. 26, 2012, the entire contents of which are hereby incorporated by reference.

TECHNICAL FIELD

The present invention relates to an image encoding device that encodes a plurality of sequentially input images to generate a plurality of encoded data that configures video data, an imaging device including the image encoding device, a captured image recording system, a method of encoding an image, and an image encoding program.

BACKGROUND ART

As rate control in generating encoded video data, there are a constant bit rate (CBR) encoding system and a variable bit rate (VBR) encoding system. In the CBR encoding system, a code amount (bit rate) per unit time in encoded video data is controlled to be constant. Therefore, in the CBR encoding system, when the encoded video data is recorded in a recording medium that has a limited storage capacity, a time to be able to record the video data in the recording medium can be accurately predicted. However, in the CBR encoding system, there are problems that the generated code amount is suppressed with respect to a complicated scene that requires a large code amount, and thus image quality is deteriorated. Further, a large code amount is generated with respect to a monotonous scene that needs only a small code amount, and thus a more storage capacity than necessary is required for the monotonous scene, in recording the video data.

In contrast, in the VBR encoding system, the generated code amount can be limited to a minimum necessary amount while high image quality is secured. However, in principle, the bit rate varies depending on a scene. Therefore, in the VBR encoding system, there is a drawback that the generated code amount per unit time cannot be predicted, and when the video data is recorded in a recording medium having a limited storage capacity, how many hours of video data can be recorded in the recording medium cannot be predicted.

As a system to solve the problem of the VBR encoding system, a two-pass VBR encoding system is known, in which, first, a standard quantization parameter is set and tentative encoding is performed, and a generated code amount is calculated, and then the image is actually encoded. According to the two-pass VBR encoding system, the actual encoding is performed after characteristics of the entire content are known through the tentative encoding. Therefore, the image can have high image quality to a maximum extent while being able to be stored in the target storage capacity. However, in the two-pass VBR encoding system, the actual encoding is performed after the tentative encoding is completed with respect to the entire content, and thus real time recording cannot be performed.

As a system to solve the above problem of the VBR encoding system in real time, there is a one-pass VBR encoding system, in which encoding is performed without performing the tentative encoding. As an image encoding device that employs the one-pass VBR encoding system, there is an image encoding device described in Patent Literature 1. In this image encoding device, in encoding a moving image, image complexity of each first image unit (for example, one GOP) is calculated according to a generated code amount of when input image data is encoded with a predetermined quantization parameter, and the quantization parameter, average image complexity of encoded images from start of the encoding to a current time is calculated according to the quantization parameter and the generated code amounts, smaller image complexity is selected between the image complexity of each first image unit and the average image complexity, a quantization parameter of the first image unit is calculated according to an average bit rate, and the quantization parameter is adjusted in each second image unit (for example, a macro-block) according to the generated code amount, and excess and deficit from the average bit rate set in advance. Therefore, the code amount can be control in real time, and encoding with high image quality can be achieved, in the VBR encoding system.

CITATION LIST

Patent Literature

Patent Literature 1: JP 3508916 B

SUMMARY OF INVENTION

Technical Problem

However, in the image encoding device described in Patent Literature 1, the image quality varies when variation of an object is continued for a longer period than the first image unit. Further, in the image encoding device described in Patent Literature 1, a time to support the continuing variation of the state of the object becomes long in proportion to an elapsed time, and the bit rate and the image quality before supporting the change deviates from the target bit rate and image quality.

The present invention has been made in view of the foregoing, and an objective is to provide an image encoding device that can record desired hours of encoded data in a recording medium having a predetermined storage capacity, in the VBR encoding system.

Solution to Problem

An image encoding device has a configuration that includes: an image encoding unit configured to encode a plurality of sequentially input images to generate a plurality of encoded data that configures video data; and a code amount control unit configured to control a code amount of the encoded data generated in the image encoding unit such that the code amount of the plurality of encoded data in a cycle unit becomes a predetermined value.

A captured image recording system is an imaged image recording system including an imaging device and an image recording device, and has a configuration that includes: a capturing unit provided in the imaging device, and configured to capture an object to generate an image; an image encoding unit provided in the imaging device, and configured to encode a plurality of input images generated in the imaging unit and sequentially input, to generate a plurality of encoded data that configures video data; a code amount control unit configured to control a code amount of the encoded data generated in the image encoding unit such that the code amount of the plurality of encoded data in a cycle unit becomes a predetermined value; and a recording medium provided in the image recording device, and having a predetermined storage capacity for recording the encoded data generated in the image encoding unit.

An imaging device has a configuration that includes: a capturing unit configured to capture an object to generate an image; an image encoding unit configured to encode a plurality of input images generated in the capturing unit and sequentially input, to generate a plurality of encoded data that configures video data; and a code amount control unit configured to control a code amount of the encoded data generated in the image encoding unit such that the code amount of the plurality of encoded data in a cycle unit becomes a predetermined value.

A method of encoding an image includes: a step of encoding a plurality of sequentially input images to generate a plurality of encoded data that configured video data; and a code amount control step of controlling a code amount of the encoded data generated in the step of encoding images such that the code amount of the plurality of encoded data in a cycle unit becomes a predetermined value.

An image encoding program causes a computer to function as: an image encoding unit configured to encode a plurality of sequentially input images to generate a plurality of encoded data that configures video data; and a code amount control unit configured to control a code amount of the encoded data generated in the image encoding unit such that the code amount of the plurality of encoded data in a cycle unit becomes a predetermined value.

Advantageous Effects of Invention

According to the present invention, the generated code amount in the cycle unit can be controlled, and desired hours of the encoded data can be recorded in a recording medium having a predetermined storage capacity.

As described below, there are other embodiments in the present invention. Therefore, this disclosure of the invention is intended to provide a part of the present invention, and is not intended to limit the scope of the invention to be herein described and claimed.

DESCRIPTION OF EMBODIMENTS

Figure 1:
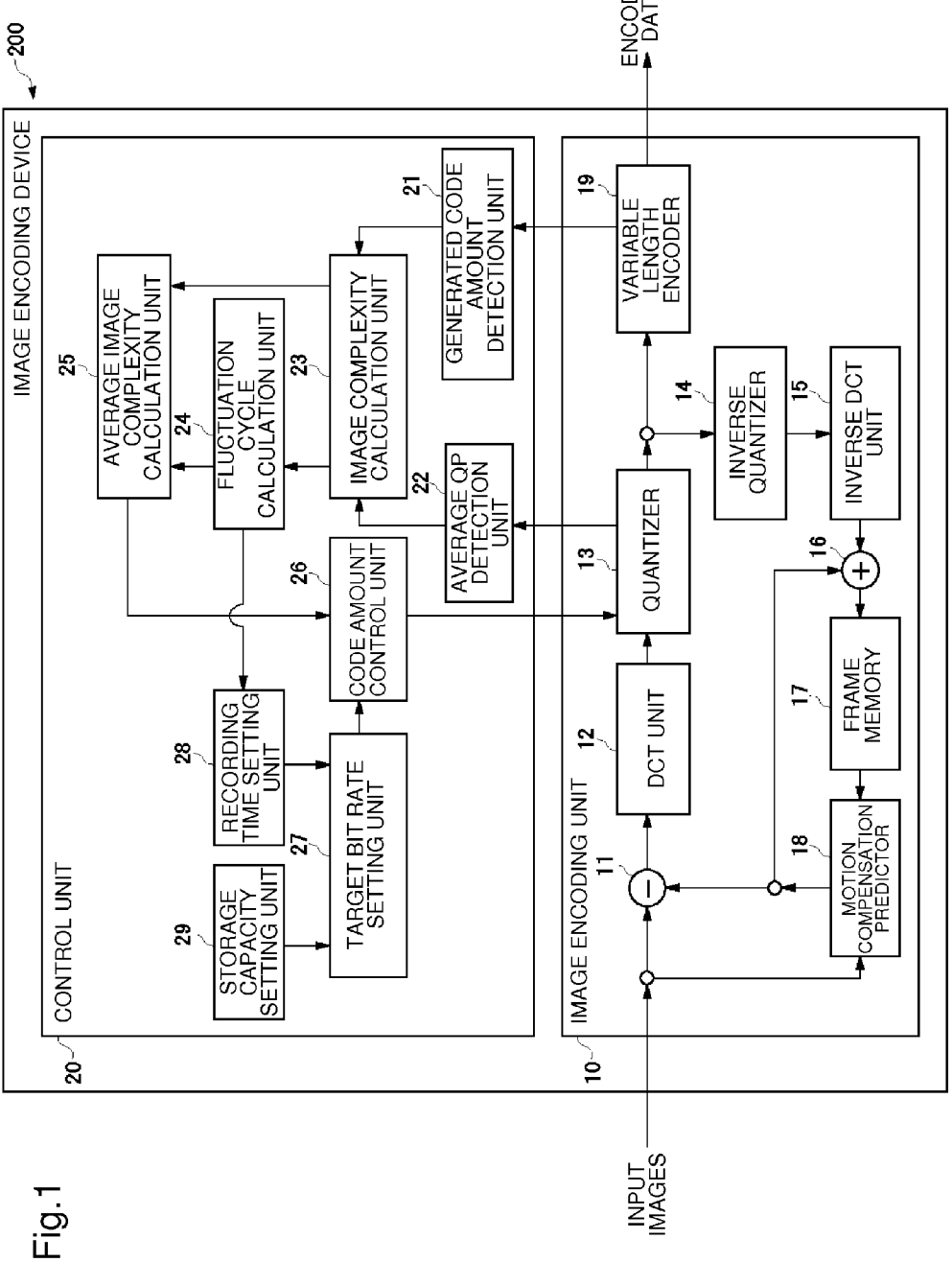
FIG. 1 is a block diagram illustrating a configuration of an image encoding device in an embodiment.

Hereinafter, details of the present invention will be described. Embodiments described below are mere examples of the present invention, and the present invention can be modified into various forms. Therefore, specific configurations and functions disclosed below do not limit the claims.

An image encoding device of an embodiment has a configuration that includes: an image encoding unit configured to encode a plurality of sequentially input images to generate a plurality of encoded data that configures video data; and a code amount control unit configured to control a code amount of the encoded data generated in the image encoding unit such that the code amount of the plurality of encoded data in a cycle unit becomes a predetermined value. With the configuration, a generated code amount in the cycle unit can be controlled, and desired hours of encoded data can be recorded in a recording medium having a predetermined storage capacity.

An image encoding device of another embodiment has a configuration that includes: an image encoding unit configured to encode a plurality of sequentially input images to generate a plurality of encoded data that configures video data; and a code amount control unit configured to control an encoding parameter to have certain image quality in a cycle unit, and to control a code amount of the encoded data generated in the image encoding unit such that the code amount in the cycle unit becomes a predetermined value. With the configuration, the image quality in the cycle unit can be made constant. Further, a generated code amount in the cycle unit can be controlled, and desired hours of encoded data can be recorded in a recording medium having a predetermined storage capacity.

In the image encoding device, the cycle unit may be a fluctuation cycle of the code amount of the encoded data or a fluctuation cycle of complexity of the input images.

Further, an image encoding device of another embodiment has a configuration that includes: an image encoding unit configured to encode a plurality of sequential input images, in which a code amount of encoded data is periodically varied, to generate a plurality of the encoded data; and a code amount control unit configured to control an encoding parameter of the image encoding unit to have certain image quality in the cycle unit. With the configuration, the image quality in the cycle unit can be made constant, and desired hours of encoded data can be recorded in a recording medium having a predetermined storage capacity.

Further, in an image encoding device of still another embodiment has a configuration that includes: an image encoding unit configured to encode a plurality of sequentially input images to generate a plurality of encoded data that configures video data; and a code amount control unit configured to control an encoding parameter of the encoded data generated in the image encoding unit to have certain image quality, in a cycle unit in which a code amount of the plurality of encoded data becomes constant. With the configuration, a generated code amount in the cycle unit can be made constant, the image quality in the cycle unit can be made constant, and desired hours of encoded data can be recorded in a recording medium having a predetermined storage capacity.

In the image encoding device, the code amount of the cycle unit may be a total generated code amount or an average bit rate, in the cycle.

The image encoding device may further include: an average image complexity calculation unit configured to calculate average image complexity of complexity of the input images in a fluctuation cycle, based on the plurality of encoded data, and the code amount control unit may control the code amount of the encoded data generated in the image encoding unit, based on the average image complexity. With the configuration, the code amount of the encoded data is controlled, based on the average image complexity in the fluctuation cycle of the complexity of the input images in the fluctuation cycle. Therefore, a total generated code amount of the complexity of the input images in the fluctuation cycle can be controlled in the VBR encoding system, and desired hours of encoded data can be recorded in a recording medium having a predetermined storage capacity.

The image encoding device may further includes: an image complexity calculation unit configured to calculate complexity of the input images, based on the encoded data; and a fluctuation cycle calculation unit configured to calculate the fluctuation cycle of the complexity calculated in the image complexity calculation unit. The average image complexity calculation unit may calculate the average image complexity in the fluctuation cycle calculated by the fluctuation cycle calculation unit. With the configuration, the fluctuation cycle of the complexity for calculating the average image complexity can be calculated from the encoded data.

In the image encoding device, the image complexity calculation unit may calculate the complexity of the input images, based on the code amount of the encoded data. With the configuration, the fluctuation cycle of the complexity of the input images can be calculated from the code amount of the encoded data.

In the image encoding device, the image complexity calculation unit may calculate the complexity of the input images, based on the code amount of the encoded data and a quantization parameter of a quantization unit. With the configuration, the fluctuation cycle of the complexity for calculating the average image complexity can be calculated from the code amount of the encoded data and the quantization parameter.

In the image encoding device, the image complexity calculation unit may calculate the complexity of each one GOP of the plurality of sequentially input images, the fluctuation cycle calculation unit may calculate the fluctuation cycle every time the complexity is calculated in the image complexity calculation unit, and the average image complexity calculation unit may calculate the average image complexity in the fluctuation cycle every time the fluctuation cycle is calculated in the fluctuation cycle calculation unit. With the configuration, the fluctuation cycle is calculated in each one GOP, and thus variation of the fluctuation cycle can be promptly supported, and the average image complexity is calculated in each one GOP, and thus the code amount can be more accurately controlled.

In the image encoding device, the fluctuation cycle calculation unit may calculate the fluctuation cycle at certain time intervals, and the average image complexity calculation unit may calculate the average image complexity in the fluctuation cycle every time the fluctuation cycle is calculated in the fluctuation cycle calculation unit. With the configuration, the fluctuation cycle is calculated at certain time intervals, and the average image complexity is calculated. Therefore, variation of the fluctuation cycle can be supported. Note that the certain time interval may be the fluctuation cycle of the complexity calculated in the fluctuation cycle calculation unit, or may be an arbitrary determined time regardless of the fluctuation cycle of the complexity.

In the image encoding device, the image encoding unit may include a quantization unit and a variable length encoding unit that performs variable length encoding of data output from the quantization unit. With the configuration, the input images are encoded through processes of quantization and variable length encoding.

In the image encoding device, the code amount control unit may control the code amount of the encoded data by adjusting a quantization parameter in the quantization unit. With the configuration, when the input images are encoded through the process of quantization, the encoded data can have a small code amount by the quantization parameter being made large, and the encoded data can have a large code amount by the quantization parameter being made small.

In the image encoding device, the code amount control unit may control the code amount of the encoded data, based on the average image complexity and a set target code amount in the fluctuation cycle. With the configuration, the average image complexity is calculated and is collated with the target code amount of the fluctuation cycle, and feedback control is performed, whereby it can be controlled such that the generated code amount in the fluctuation cycle becomes the target code amount. Note that the target code amount in the fluctuation cycle may be an average bit rate in the fluctuation cycle, or may be a total generated code amount in the fluctuation cycle.

In the image encoding device, the average image complexity calculation unit may calculate the average image complexity, using an operation time of the image encoding device in one day, as the fluctuation cycle. With the configuration, when variation of complexity of the input images is known in advance, where one day is a cycle, and the operation time of one day is known in advance, such as a case of capturing a moving image of customers who visit a shop, the operation time can be employed as the fluctuation cycle.

In the image encoding device, the average image complexity calculation unit may calculate the average image complexity, using an operation time of the image encoding device in one week, as the fluctuation cycle. With the configuration, when variation of complexity of the input images is known in advance, where the one week is a cycle, and the operation time of the one week is known in advance, the operation time can be employed as the fluctuation cycle.

A captured image recording system of an embodiment is an imaged image recording system including an imaging device and an image recording device, and has a configuration that includes: a capturing unit provided in the imaging device, and configured to capture an object to generate an image; an image encoding unit provided in the imaging device, and configured to encode a plurality of input images generated in the imaging unit and sequentially input, to generate a plurality of encoded data that configures video data; a code amount control unit configured to control a code amount of the encoded data generated in the image encoding unit such that the code amount of the plurality of encoded data in a cycle unit becomes a predetermined value; and a recording medium provided in the image recording device, and having a predetermined storage capacity for recording the encoded data generated in the image encoding unit. With the configuration, a generated code amount in the cycle unit can be controlled, and desired hours of encoded data can be recorded in the recording medium having a predetermined storage capacity.

The captured image recording system may further include: an image complexity calculation unit configured to calculate complexity of the input images, based on the encoded data; a fluctuation cycle calculation unit configured to calculate a fluctuation cycle of the complexity calculated in the image complexity calculation unit; and an average image complexity calculation unit configured to calculate average image complexity in the fluctuation cycle calculated in the fluctuation cycle calculation unit. The code amount control unit may control the code amount of the encoded data generated in the image encoding unit, based on the average image complexity. With the configuration, the code amount of the encoded data is controlled, based on the average image complexity of the complexity of the input images in the fluctuation cycle, and the fluctuation cycle of the complexity for calculating the average image complexity can be calculated from the encoded data.

In the captured image recording system, the image complexity calculation unit and the fluctuation cycle calculation unit may be provided in the image recording device. With the configuration, calculation resources required for the imaging device can be decreased, and the imaging device can be configured to be a cheap, small, and light imaging device.

In the captured image recording system, the average image complexity calculation unit may be provided in the image recording device. With the configuration, the calculation resources required for the imaging device can be decreased, and the imaging device can be configured to be a cheap, small, and light imaging device.

An imaging device of an embodiment has a configuration that includes: a capturing unit configured to capture an object to generate an image; an image encoding unit configured to encode a plurality of input images generated in the capturing unit and sequentially input, to generate a plurality of encoded data that configures video data; and a code amount control unit configured to control a code amount of the encoded data generated in the image encoding unit such that the code amount of the plurality of encoded data in a cycle unit becomes a predetermined value. With the configuration, a generated code amount in the cycle unit can be controlled, and desired hours of encoded data can be recorded in a recording medium having a predetermined storage capacity.

A method of encoding an image of an embodiment includes: a step of encoding a plurality of sequentially input images to generate a plurality of encoded data that configured video data; and a code amount control step of controlling a code amount of the encoded data generated in the step of encoding images such that the code amount of the plurality of encoded data in a cycle unit becomes a predetermined value. With the configuration, a generated code amount in the cycle unit can be controlled, and desired hours of encoded data can be recorded in a recording medium having a predetermined storage capacity.

An image encoding program of an embodiment causes a computer to function as: an image encoding unit configured to encode a plurality of sequentially input images to generate a plurality of encoded data that configures video data; and a code amount control unit configured to control a code amount of the encoded data generated in the image encoding unit such that the code amount of the plurality of encoded data in a cycle unit becomes a predetermined value. With the configuration, a generated code amount in the cycle unit can be controlled, and desired hours of encoded data can be recorded in a recording medium having a predetermined storage capacity.

Hereinafter, an image encoding device and a captured image recording system including the image encoding device of an embodiment will be described with reference to the drawings. Hereinafter, as one form of the image encoding device, an image encoding device that encodes a moving image by a system of MPEG-2 will be exemplarily descried. However, the encoding system of the image encoding device is not limited to the MPEG-2, and another system such as MPEG-1, H.261, or H.263 can be employed.

Figure 2:
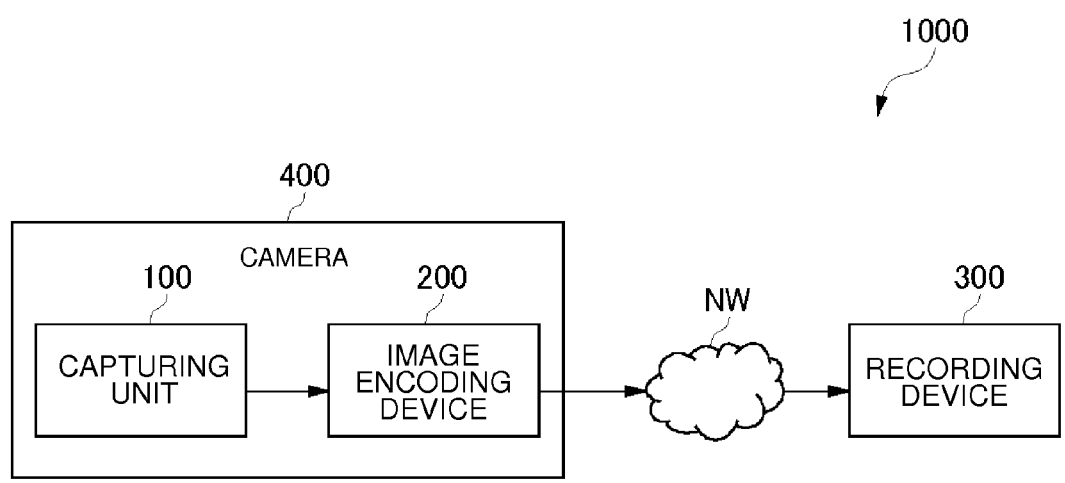
FIG. 2 is a block diagram illustrating a captured image recording system in an embodiment.

FIG. 2 is a block diagram illustrating a captured image recording system 1000 of an embodiment. The captured image recording system 1000 includes a capturing unit 100, an image encoding device 200, and a recording device 300. The capturing unit 100 is connected with the image encoding device 200, and further, the image encoding device 200 is connected to the recording device 30. In the present embodiment, the capturing unit 100 and the image encoding device 200 are included in a camera 400 as an imaging device, and the image encoding device 200 in the camera 400 is connected with the recording device 300 through a network NW. Note that the network NW does not necessarily lie between the image encoding device 200 and the recording device 300, and for example, the captured image recording system 1000 may have a configuration in which the recording device 300 is built in the camera 400.

Such a captured image recording system 1000 can be applied as a monitor video recording system that records a video of a monitoring camera installed in a shop or the like, for example. In this case, the camera 400 as the monitoring camera is installed to capture near the entrance of the shop, and the recording device 300 is installed in a monitoring center. The camera 400 and the recording device 300 perform communication through the Internet. Accordingly, the monitor video captured by the monitoring camera is recorded in the recording device 300.

The capturing unit 100 is a typical capturing unit that includes a lens, an imaging element, and the like. The capturing unit 100 captures an object, and generates and outputs sequential frame images at a predetermined frame rate (for example, 1/30 seconds). The frame images generated in the capturing unit 100 are sequentially input to the image encoding device 200 as input images. The image encoding device 200 encodes these input images to generate a plurality of encoded data that configures video data. Here, the image encoding device 200 encodes the input images according to the VBR encoding system. The plurality of generated encoded data is transmitted to the recording device 300 through the network NW. The recording device 300 includes a recording medium having a predetermined storage capacity, and records the plurality of encoded data (video data) transmitted through the network NW, in the recording medium.

Here, it is convenient if the video data can be recorded in the recording medium of the recording device 300 to the full storage capacity, and timing when a free space in the recording medium is run out can be specified. This is because the video data recorded in the recording medium can be copied to another recording medium and a free space can be secured, or switching to a new recording medium can be performed. However, the image encoding device 200 encodes the input images according to the VBR encoding system, and thus the generate code amount is varied depending on the content of the input image, and the image encoding device 200 cannot predict the variation. Therefore, to avoid the situation where the free space in the recording medium of the recording device 300 is run out and recording cannot be performed, the free space in the recording medium of the recording device 300 needs to be monitored. Therefore, the present embodiment provides the captured image recording system 1000 that secures image quality according to the VBR encoding system, and can specify hours (the number of days) of the video to be recorded in the recording medium of the recording device 300.

FIG. 1 is a block diagram illustrating a configuration of an image encoding device of an embodiment. The image encoding device 200 includes an image encoding unit 10 that encodes sequentially input images to generate encoded data that configures video data, and a control unit 20 that controls a generated code amount in the image encoding unit 10. The image encoding unit 10 includes a subtractor 11, a DCT unit 12, a quantizer 13, an inverse quantizer 14, an inverse DCT unit 15, an adder 16, a frame memory 17, a motion compensation predictor 18, and a variable length encoder 19.

Sequential frame images captured in the capturing unit 100 are input to the image encoding unit 10, as input images. In the image encoding unit 10, the input images are classified into an I picture that is to be subjected to intra-frame encoding, a P picture that is to be subjected to inter-frame predictive encoding only by forward direction prediction, and a B picture that is to be subjected to inter-frame predictive encoding in both of the forward direction and a backward direction. Further, in the image encoding unit 10, the input images are divided into macroblocks of 16×16 pixels, and are to be subjected to encoding processing in macroblock units.

The input image of the I picture input to the subtractor 11 is input to the DCT unit 12, as it is. The DCT unit 12 discrete cosine transforms the input image to generate a DCT coefficient, and outputs the DCT coefficient to the quantizer 13. The quantizer 13 quantizes the input DCT coefficient with a quantization parameter (quantization width) specified by a code amount control unit 26 described below to generate a quantization transform coefficient, and outputs the quantization transform coefficient to the inverse quantizer 14 and the variable length encoder 19. The variable length encoder 19 encodes the input quantization transform coefficient to generate and output encoded data of the I picture.

The inverse quantizer 14 inversely quantizes the input quantization transform coefficient to generate an inverse quantization transform coefficient, and output the inverse quantization transform coefficient to the inverse DCT unit 15. The inverse DCT unit 15 inversely discrete cosine transforms the input inverse quantization transform coefficient to restore the input image. The restored input image is recorded in the frame memory 17 in order to be used as a reference image in subsequent inter-frame prediction.

The input images of the P picture and the B picture are input to the motion compensation predictor 18. The motion compensation predictor 18 compares the input images and the reference image recorded in the frame memory 17, and calculates a motion vector for each macroblock. The motion compensation predictor 18 further performs motion compensation frame prediction based on the calculated motion vectors, thereby to generate prediction images with respect to the input images. The prediction images generated in the motion compensation predictor 18 are output to the subtractor 11 and the adder 16.

The subtractor 11 calculates a difference image between the input image and the prediction image, and outputs the difference image to the DCT unit 12. The DCT unit 12 discrete cosine transforms the input difference image to calculate a DCT coefficient, and outputs the DCT coefficient to the quantizer 13. The quantizer 13 quantizes the input DCT coefficient with the quantization parameter specified by the code amount controller 25 to generate a quantization transform coefficient, and outputs the quantization transform coefficient to the inverse quantizer 14 and the variable length encoder 19. The variable length encoder 19 encodes the input quantization transform coefficient to generate and output encoded data of the P picture or the B picture.

The inverse quantizer 14 inversely quantizes the input quantization transform coefficient to generate an inverse quantization transform coefficient, and outputs the inverse quantization transform coefficient to the inverse DCT unit 15. The inverse DCT unit 15 inversely discrete cosine transforms the input inverse quantization transform coefficient to restore the difference image, and outputs the difference image to the adder 16. The adder 16 adds the input difference image and the prediction image output by the motion compensation predictor 18 before to restore the input image. The restored input image is recorded in the frame memory 17, as the reference image.

Hereinafter, similar processing is repeated, so that encoded data of the I picture, the P picture, and the B picture are output from the variable length encoder 19 in a predetermined order as a bit stream. The bit stream output from the variable length encoder 19 is output to the recording device 300.

The quantization parameter in the quantizer 13 is variable, and when the quantization parameter is made large, the code amount of the encoded data generated in the variable length encoder 19 becomes small. On the other hand, when the quantization parameter in the quantizer 13 is made small, the code amount of the encoded data generated in the variable length encoder 19 becomes large. Note that, apparently, even if the quantization parameter is fixed, the code amount of the generated encoded data becomes larger as a spatial frequency of the input image is higher, or there is more intense movement of an object in the input image.

In the above encoding process, the quantization parameter used in the quantizer 13 is output to an average QP detection unit 22. Further, the encoded data generated in the variable length encoder 19 is output to a generated code amount detection unit 21. The average QP detection unit 22 calculates an average of the quantization parameters (average quantization parameter) of one GOP, and outputs the average quantization parameter to an image complexity calculation unit 23. Further, the generated code amount detection unit 21 accumulates the generated code amounts of one GOP, calculates a bit rate of the one GOP, and outputs the bit rate to the image complexity calculation unit 23.

Here, the group of picture (GOP) means a set of a plurality of frames including at least one frame of the I picture. When the one frame of the I picture is included, the GOP is a minimum unit structure that configures a reproducible moving image. Further, the generated code amount detector 21 divides a total sum of the code amounts of a plurality of encoded data of one GOP by the time of the one GOP, thereby to calculate the bit rate.

The image complexity calculation unit 23 calculates image complexity based on the average quantization parameter input from the average QP detection unit 22 and the bit rate input from the generated code amount detector 21. The image complexity (Fim) is a value indicating difficulty of encoding or complexity of an image, which is obtained by applying the input average quantization parameter ($QP_{AVG}$) and the bit rate (Br) to a predetermined transformation function $f_1$, and is calculated by the following formula (1):

$$Fim = f_1(QP_{AVG}, Br) \qquad (1)$$

Here, the transformation function $f_1$ is selected such that the image complexity (Fim) is simply increased with respect to respective increases of the average quantization parameter ($QP_{AVG}$) and the bit rate (Br). The calculated image complexity is output to a fluctuation cycle calculation unit 24 and an average image complexity calculation unit 25.

The fluctuation cycle calculation unit 24 records the image complexity of each GOP input from the image complexity calculation unit 23, and performs a frequency analysis with respect to the recording, thereby to calculate a fluctuation cycle. The fluctuation cycle calculation unit 24 of the present invention employs Fourier transform as the frequency analysis. However, another frequency analysis such as an analysis using an autocorrelation function may be performed. The fluctuation cycle calculation unit 24 periodically calculates the fluctuation cycle in each set cycle (for example, once a day), or in each latest fluctuation cycle calculated by the fluctuation cycle calculation unit 24. Further, the fluctuation cycle calculation unit 24 calculates the fluctuation cycle according to an external trigger input (for example, an instruction from the user) regardless of whether it becomes a time to calculate the fluctuation cycle. The user instructs the calculation of the fluctuation cycle when the user has changes an operation time of a day.

The fluctuation cycle calculation unit 24 applies the Fourier transform to the image complexity of an immediate preceding one week (7 days), thereby to calculate the fluctuation cycle. Note that, when the images are not sequentially input throughout one week, for example, when the images of only 8 hours are input every day (the image encoding device is operated only for 8 hours every day), the fluctuation cycle calculation unit 24 performs the frequency analysis of the image complexity of the immediately preceding one week (8 hours×7 days) to calculate the fluctuation cycle. The calculated fluctuation cycle is output to a recording time setting unit 28 and the average image complexity calculation unit 25.

The average image complexity calculation unit 25 calculates an average of the image complexity (average image complexity $Fim_{AVG}$) of one cycle of the fluctuation cycle calculated in the fluctuation cycle calculation unit 24, based on the fluctuation cycle input from the fluctuation cycle calculation unit 24, and outputs the average image complexity $Fim_{AVG}$ to the code amount control unit 26. The average image complexity calculation unit 25 calculates average image complexity in the latest one fluctuation cycle in each one GOP using the image complexity of one fluctuation cycle before the GOP of the image complexity. The average image complexity calculation unit 25 may calculate the average image complexity in each one cycle of the fluctuation cycle calculated in the fluctuation cycle calculation unit 24, or may calculate the average image complexity every time the image complexity is input from the image complexity calculation unit 23. When having calculated the average image complexity, the average image complexity calculation unit 25 outputs the average image complexity to the code amount control unit 26.

The recording time setting unit 28 calculates a recording time, based on an operation time of one day and the number of desired recording days. The number of desired recording days is set by the user, as the number of days of data that the user wishes to record in a recording medium of the recording device 300. As the operation time of one day, the fluctuation cycle calculated by the fluctuation cycle calculation unit 24 is used. The operation time of one day may be set to the recording time setting unit 28 by the user. The recording time setting unit calculates the recording time by multiplying the operation time of one day by the number of desired recording days. For example, when the operation time of one day (fluctuation cycle) is 8 hours, and the user wishes to record video data of 30 days in the recording medium, the recording time set in the recording time setting unit 28 becomes 240 hours (=8 hours×30 days). The recording time setting unit 28 outputs the calculated recording time to the target bit rate setting unit 27.

A storage capacity of the recording medium of the recording device 300 is set to a storage capacity setting unit 29 by the user. The storage capacity setting unit 29 may acquire information of the storage capacity of the storage medium from the recording device 300. The storage capacity setting unit 29 outputs the information of the storage capacity to the target bit rate setting unit 27.

The target bit rate setting unit 27 sets a target bit rate, based on the storage capacity of the storage medium of the recording device 300 obtained from the storage capacity setting unit 29 and the recording time obtained from the recording time setting unit 28. When the storage capacity of the recording medium of the recording device 300 is 480 GB, and the recording time is 240 hours, a total generated code amount per one hour should be about 2 GB/h (=480 GB/240 hours). That is, in this case, the average bit rate should be about 4.55 Mbps (=2 GB×8×1024/60 minutes/60 seconds). In this case, the target bit rate setting unit 27 sets 4.55 Mbps as the target bit rate.

The code amount control unit 26 determines the quantization parameter, based on the average image complexity obtained from the average image complexity calculation unit 25 and the target bit rate obtained from the target bit rate setting unit 27. To be specific, the code amount control unit 26 determines the quantization parameter QP of when the DCT coefficient is quantized in the quantizer 13, by the following formula (2):

$$QP=f_2(Fim_{AVG},TgtBr) \qquad (2)$$

Here, $Fim_{AVG}$ is the average image complexity, TgtBr is the target bit rate, and $f_2$ is a function to determine how much quantization parameter should be used for the quantization in order to achieve the target bit rate from the average image complexity.

The code amount control unit 26 sets the calculated quantization parameter to the quantizer 13. The quantizer 13 quantizes the DCT coefficient with the quantization parameter set by the code amount control unit 26. As described above, the image complexity calculation unit 23 calculates the image complexity in each GOP, and the average image complexity calculation unit 25 calculates the average image complexity in each GOP. Therefore, the code amount control unit 26 calculates the quantization parameter in each GOP, and the quantizer 13 changes the quantization parameter in each GOP.

Figure 3:
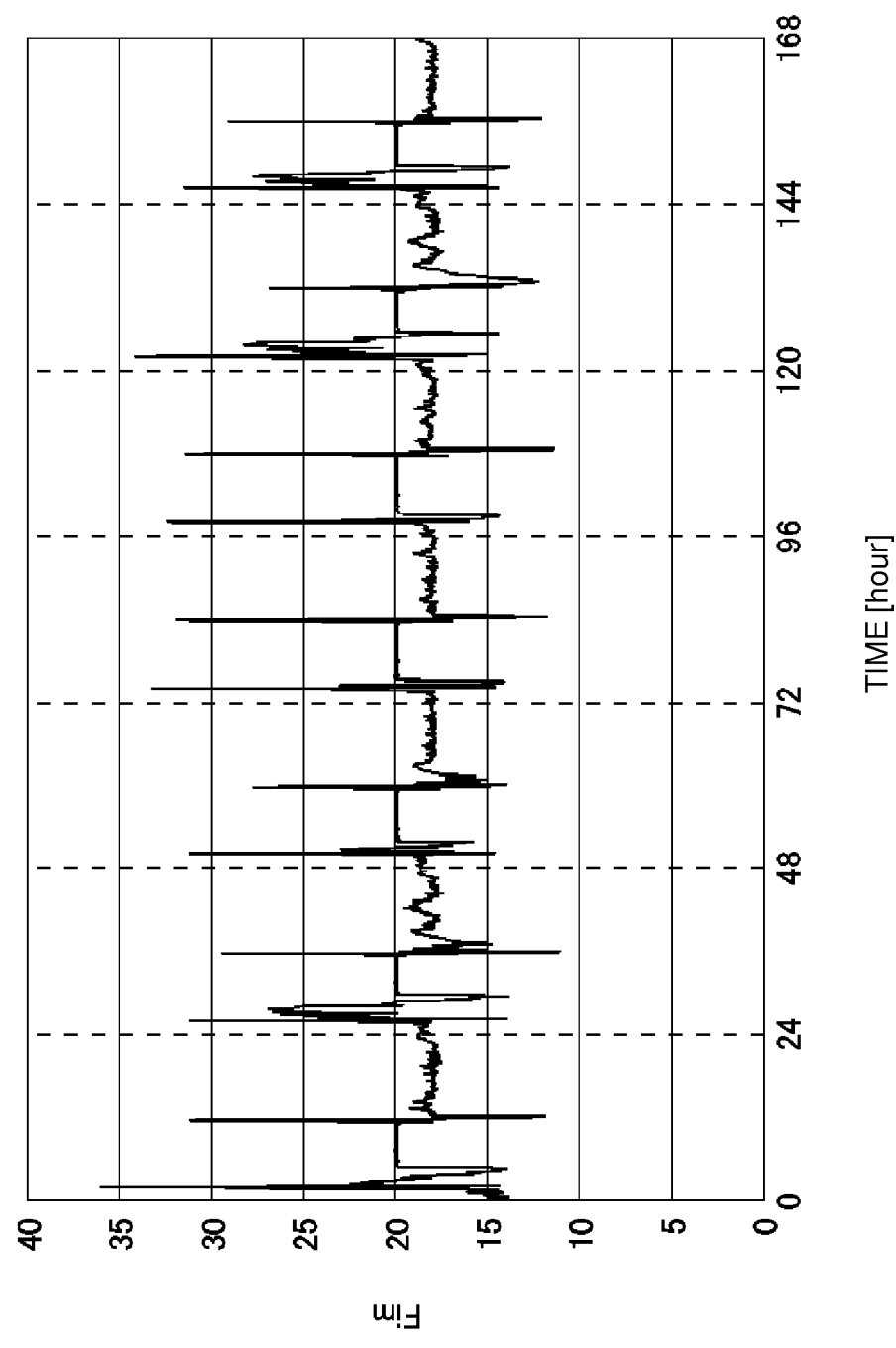
FIG. 3 is a graph illustrating an example of variation of image complexity of one GOP in an embodiment.

The reason why the average of the image complexity in one cycle of the fluctuation cycle is calculated in the average image complexity calculation unit 25 is as follows. FIG. 3 is a graph illustrating an example of variation of the image complexity of one GOP. In the example of FIG. 3, the image complexity of one week (7 days) is recorded, where one GOP is one second. When the amount of movement of the object is varied depending on a period of time, the image complexity can be varied in the VBR encoding system, as illustrated in FIG. 3.

For example, when the camera 400 is installed in a shop and is used as a monitoring camera, the complexity of the input image is varied such that, while many customers visit the shop in the daytime and there is more intense movement of the object, and thus the input images become complicated, less customers visit the shop and the input images become monotonous images similarly to a still image. As described above, the complexity of the input images is substantially varied in the daytime and in the night. However, if the variation periodically occurs, the total generated code amount in an arbitrary one fluctuation cycle becomes nearly constant, that is, the average bit rate of when an average in an arbitrary one fluctuation cycle is calculated becomes nearly constant. Therefore, it can be confirmed that how many days (how may cycles) of a video can be recorded in the recording device 300.

Figure 4:
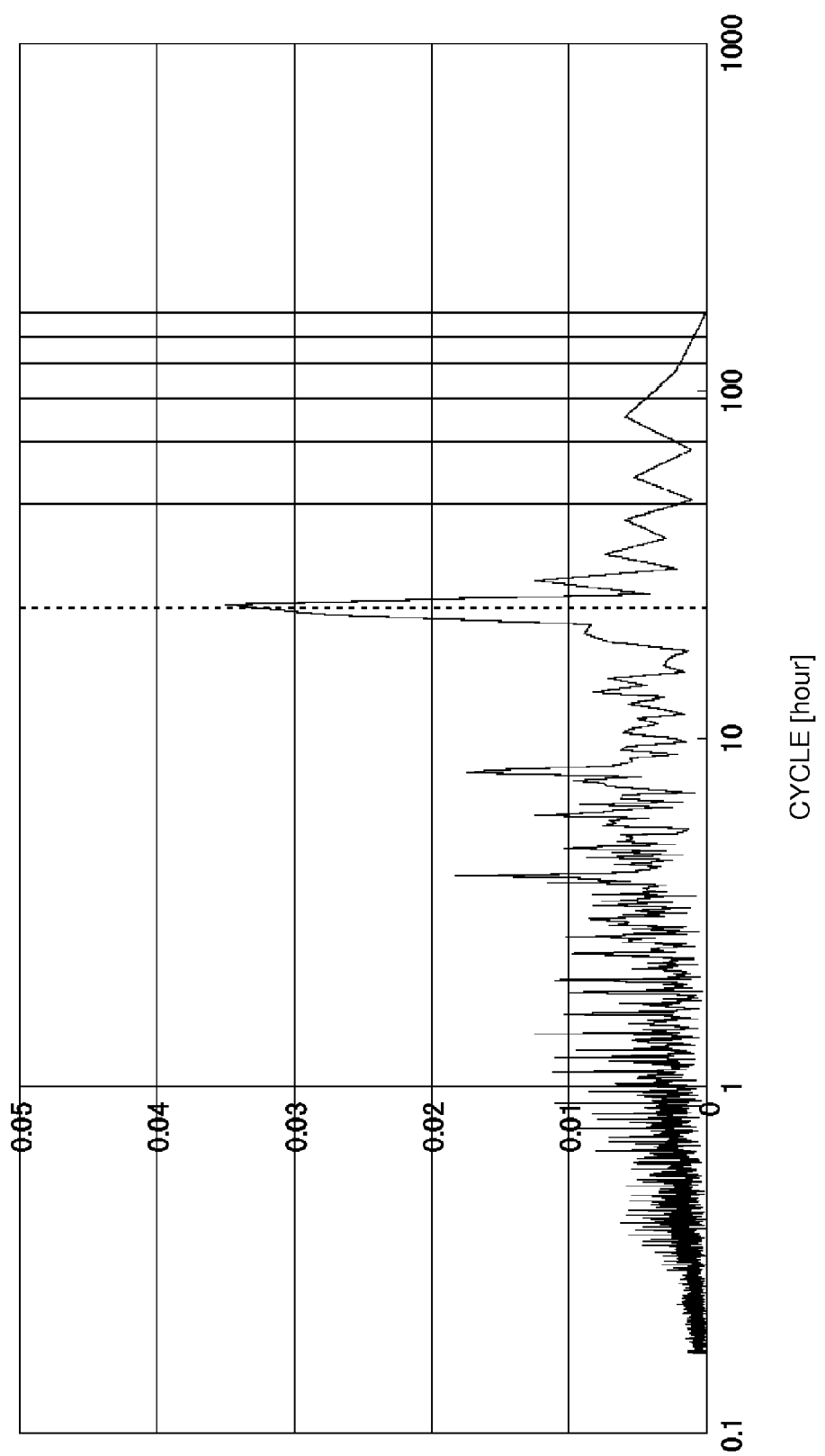
FIG. 4 is a graph illustrating a frequency spectrum that is obtained by performing Fourier transform with respect to the image complexity in an embodiment.

FIG. 4 is a graph illustrating a frequency spectrum obtained by performing the Fourier transform with respect to the image complexity of FIG. 3. The fluctuation cycle calculation unit 24 performs the Fourier transform with respect to the image complexity, thereby to obtain the frequency spectrum of FIG. 4. The fluctuation cycle calculation unit 24 employs, from the frequency spectrum, a cycle having a maximum peak, as the fluctuation cycle. In the example of FIG. 4, the largest peak appears at 24 hours. Therefore, the fluctuation cycle of the image complexity of FIG. 3 is calculated as 24 hours.

The code amount control unit 26 sets the quantization parameter and controls the code amount such that the average bit rate in the fluctuation cycle (24 hours in the examples of FIGS. 3 and 4) calculated in the fluctuation cycle calculation unit 24 becomes the target bit rate, rather than controlling the code amount such that the bit rate of one GOP becomes the target bit rate. That is, the code amount control unit 26 controls the quantization parameter such that the total generated code amount in one fluctuation cycle or the average bit rate in one fluctuation cycle becomes a target value, while allowing, as the VBR encoding system, the bit rate to become high when the input images are complicated, and the bit rate to become low when the input images are monotonous, in one fluctuation cycle. Therefore, the code amount control unit 26 determines the quantization parameter from the relationship between the average image complexity in one fluctuation cycle obtained in the average image complexity calculation unit 25 and the target bit rate, instead of the relationship between the image complexity of each one GOP obtained in the image complexity calculation unit 23 and the target bit rate.

Figure 5:
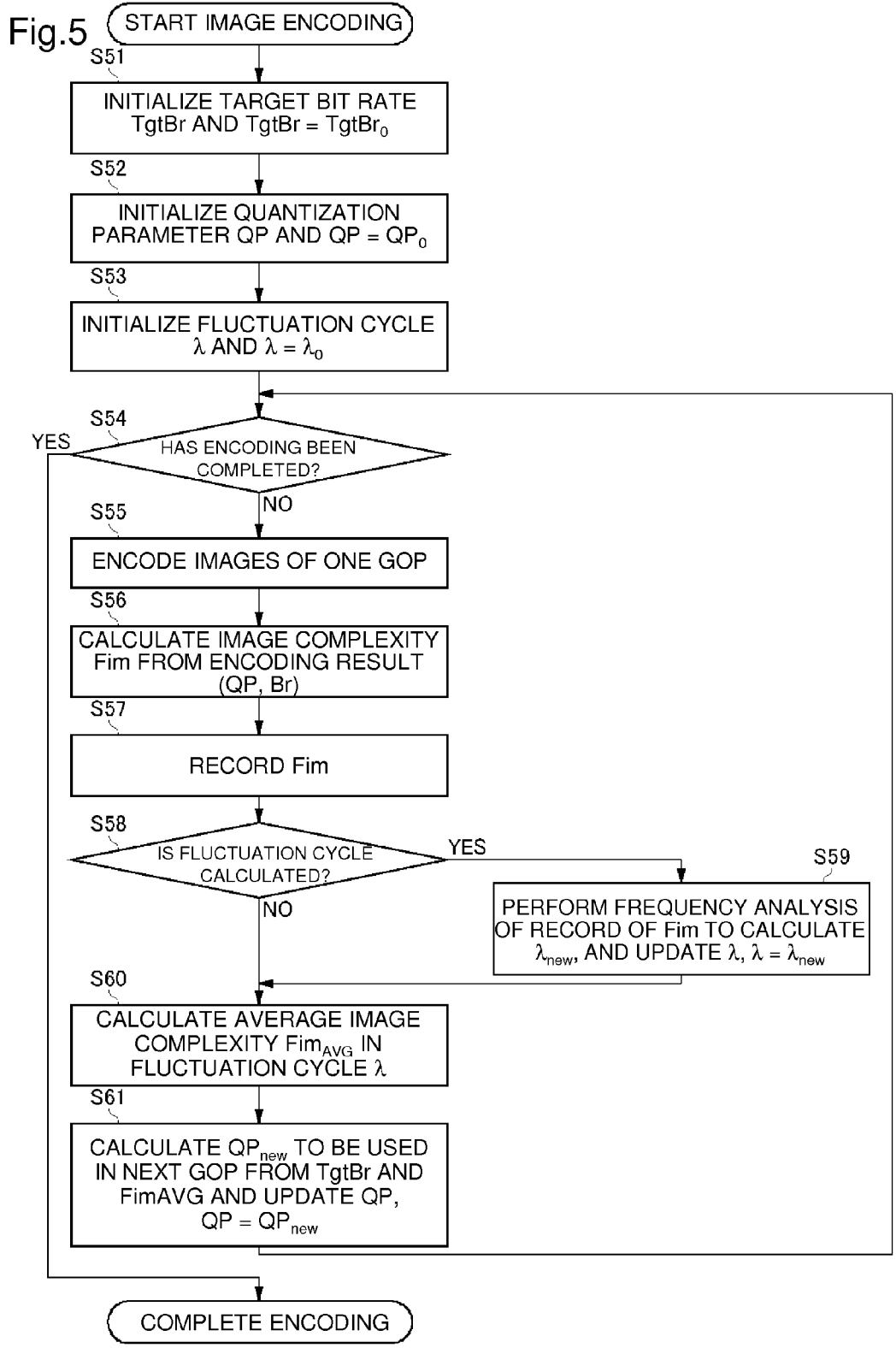
FIG. 5 is a flow chart illustrating an operation of an image encoding device in an embodiment.

FIG. 5 is a flow chart illustrating an operation of the image encoding device 200 of the present embodiment. When the processing of the image encoding is started, first, the target bit rate TgtBr is initialized, and TgtBr=TgtBr$_0$ is obtained (step S51). Further, the quantization parameter QP is initialized, and QP=QP$_0$ is obtained (step S52). Further, the fluctuation cycle λ is initialized, and λ=λ$_0$ is obtained (step S53).

Next, whether the encoding has been completed is determined (step S54). When the encoding has not been completed, that is, when the frame images are still being input (NO at step S54), the image encoding unit 10 encodes the input images of one GOP (step S55). Following that, the image complexity calculation unit 23 calculates the image complexity Fim by the above formula (1) according to a result of the encoding at step S55, that is, the average QP of that time and the bit rate Br (step S56). The fluctuation cycle calculation unit 24 and the average image complexity calculation unit 25 record the image complexity Fim (step S57).

The fluctuation cycle calculation unit 24 determines whether calculating the fluctuation cycle (step S58). When there is an external trigger, or when it becomes a time to calculate the fluctuation cycle, the fluctuation cycle calculation unit 24 determines to calculate the fluctuation cycle. When having determined to calculate the fluctuation cycle (YES at Step S58), the fluctuation cycle calculation unit 24 performs the frequency analysis of the recording of the immediate past one week of the image complexity Fim to calculate the fluctuation cycle λ$_{new}$, and updates the fluctuation cycle λ, as λ=λ$_{new}$ (step S59).

When there is no external trigger for calculating the fluctuation cycle, and when it has not become a time to calculate the fluctuation cycle (NO at step S58), and after updating the fluctuation cycle λ at step S59, the average image complexity calculation unit 25 calculates the average image complexity Fim$_{AVG}$ in the fluctuation cycle λ (step S60). Following that, the code amount control unit 26 calculates the quantization parameter QP$_{new}$ to be used in the next GOP, from the target bit rate (TgtBr) and the average image complexity Fim$_{AVG}$, and updates the quantization parameter QP, as QP=QP$_{new}$ (step S61). Then, returning to step S54, whether the encoding has been completed, that is, whether there is still an input image to be encoded, is determined. When there is no input image to be encoded, and when the encoding has been completed (NO at step S54), the processing is terminated.

As described above, in the image encoding device 200 of the present embodiment, the quantization parameter is controlled such that the average bit rate in one fluctuation cycle of the complexity of the input images becomes the target bit rate. Therefore, the generated code amount in one fluctuation cycle is fixed to a predetermined value. Further, when the complexity of the input images is varied in the one fluctuation cycle, the code amount is varied according to the change, that is, when a large code amount is necessary, a large code amount is generated. Therefore, the image quality is maintained by the VBR encoding system.

Modification

In the above embodiment, the image complexity calculation unit 23 calculates the image complexity (Fim) based on the bit rate (Br) based on the generate code amount of one GOP and the average quantization parameter (QP$_{AVG}$) of one GOP. However, the image complexity calculation unit 23 may only refer to the generated code amount, and employ the generated code amount (Br) as it is, as the image complexity (Fim).

In this case, during a period (one week in the above example) of which a fluctuation cycle calculation unit 24 performs a frequency analysis, a quantization parameter should be fixed. This is because, if the quantization parameter is varied during this period, a generated code amount does not become image complexity in a strict sense. Therefore, during the period subjected to the frequency analysis by the fluctuation cycle calculation unit 24, a code amount control unit 26 should not update the quantization parameter for controlling the code amount, and therefore, during the period, an average image complexity calculation unit 25 does not calculate average image complexity.

Figure 6:
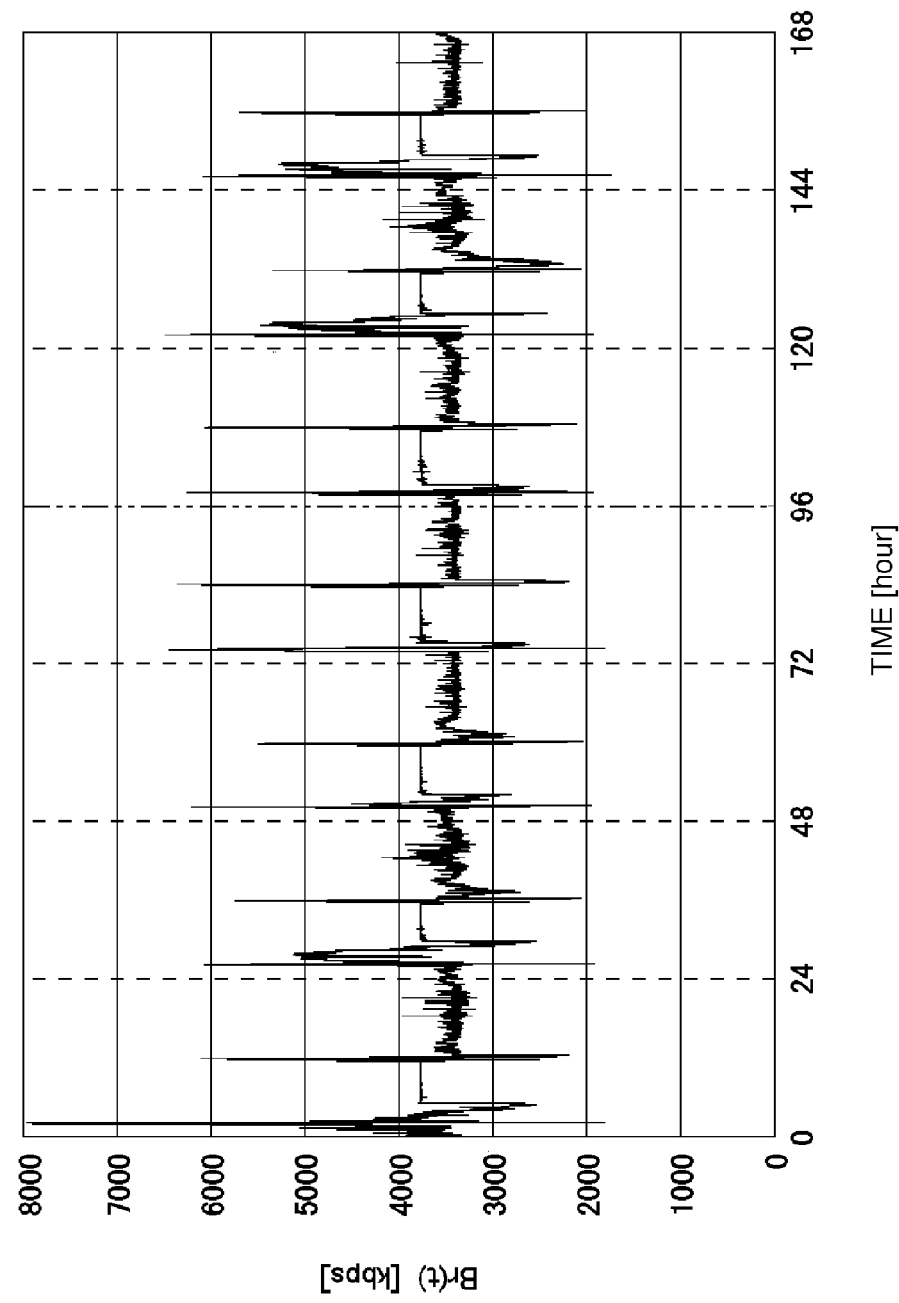
FIG. 6 is a graph illustrating an example of variation of a bit rate of one GOP in a modification of an embodiment.

FIG. 6 is a graph illustrating an example of variation of a bit rate of one GOP in the same case as FIG. 3. When comparing FIG. 6 with FIG. 3, a vertical motion of the bit rate is similar to that of the image complexity, and thus when variation of the bit rate of FIG. 6 is subjected to Fourier transform, a largest peak appears at 24 hours, similarly to FIG. 4. This means that the bit rate as it is can be treated as the image complexity.

In the above embodiment, the fluctuation cycle calculation unit 24 performs the frequency analysis of the image complexity calculated in the image complexity calculation unit 23, thereby to calculate the fluctuation cycle therefrom.

However, an image encoding device 200 may not include the fluctuation cycle calculation unit 24. In this case, the fluctuation cycle is set to a recording time setting unit 28 by a user. The average image complexity calculation unit 25 uses the cycle set in the recording time setting unit 28, as the fluctuation cycle, and calculates an average of image complexity during the cycle. For example, in a case of a monitoring camera that captures customers who visit a shop, the fluctuation cycle is an operation time of one day, and the user can set the operation time to the recording time setting unit 28, as the fluctuation cycle.

Further, calculation of the average image complexity by the average image complexity calculation unit 25 and calculation of the quantization parameter by the code amount control unit 26 may be performed at arbitrary timing. For example, the calculation may be performed in each one GOP, as described above, or may be performed in each one fluctuation cycle. In either case, when the average image complexity calculation unit 25 calculates the average image complexity, the average image complexity calculation unit 25 obtains an average of the image complexity of an immediate preceding one fluctuation cycle. The code amount control unit 26 may calculate the quantization parameter every time the average image complexity calculation unit 25 calculates new average image complexity.

Further, a time interval of when the fluctuation cycle calculation unit 24 periodically calculates the fluctuation cycle may be an arbitrary time interval. When calculating the fluctuation cycle in a shortest cycle, the fluctuation cycle calculation unit 24 may calculate the fluctuation cycle every time image complexity is input from the image complexity calculation unit 23, that is, in each one GOP. Note that, when calculating the fluctuation cycle from the image complexity, and when calculating the image complexity only from the generated code amount, as described above, the quantization parameter is not updated during the period (for example, one week) subjected to the frequency analysis by the fluctuation cycle calculation unit 24, and thus in this case, calculation of the fluctuation cycle in each one GOP becomes redundant.

Further, in the above-described embodiment, the code amount control unit 26 determines the quantization parameter, such that the average bit rate in the fluctuation cycle becomes the target bit rate set in the target bit rate setting unit 27, based on the average image complexity calculated in the average image complexity calculation unit 25. However, the code amount control unit 26 may receive a feedback of the average quantization parameter of each one GOP from the average QP detection unit 22, and determine the quantization parameter by referring to the feedback.

Further, the fluctuation cycle calculation unit 24 of the above-described embodiment determines the cycle having the maximum peak, as the fluctuation cycle, as a result of performing the Fourier transform of the image complexity. However, the method of determining the fluctuation cycle is not limited thereto. For example, the fluctuation cycle may be the maximum cycle, of cycles having peaks of a predetermined size or more. Further, when there is a plurality of cycles having peaks of a predetermined size or more, a least common multiple of the plurality of cycles may be employed as the fluctuation cycle. For example, when there are some cycles having relatively large peaks, or when the cycle having the maximum peak is extremely short and rapid variation of image quality is concerned, it is advantageous to employ the least common multiple of the plurality of cycles, as the fluctuation cycle.

The captured image recording system of the above-described embodiment is formed of the camera 400 and the recording device 300, as illustrated in FIG. 2, and the capturing unit 100 and the image encoding device 200 are provided in the camera 400. Then, as illustrated in FIG. 1, the image encoding device 200 includes the image encoding unit 10 and the control unit 20. However, the configuration of the captured image recording system is not limited thereto, and a part of the configuration of the image encoding device 200 illustrated in FIG. 1 may be included in the recording device 300, instead of in the camera 400.

Typically, the encoding of the input images is performed by the camera 400, and thus many of calculation resources of the camera 400 are used for the encoding of the input images. When the configuration illustrated in FIG. 1 is employed as the configuration of the image encoding device 200 included in the camera 400, allocation of the calculation resources of the control unit 20 tends to become small, in the camera 400, which is required to be cheap, small, and light. Meanwhile, the recording device 300 can be configured from a video recorder or a personal computer, and thus can relatively easily have room in the calculation resources. Therefore, a part of the configuration of the image encoding device 200 is provided in the recording device 300, instead of in the camera 400, whereby the processing in the camera 400 can be decreased, and the calculation resources required in the camera 400 can be decreased. Hereinafter, a modification of the entire configuration of the captured image recording system will be described.

Figure 7:
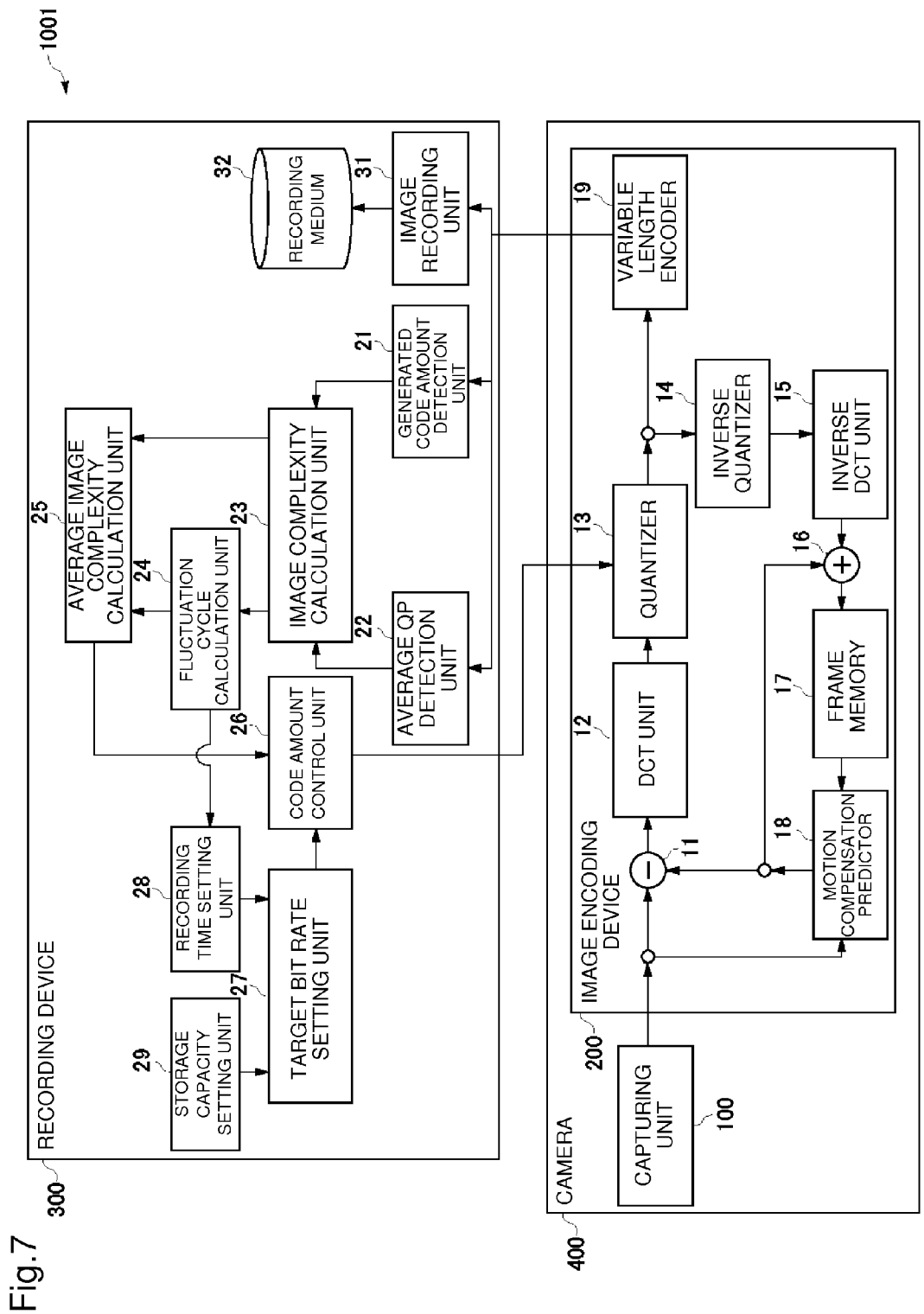
FIG. 7 is a block diagram illustrating a captured image recording system in a first modification of an embodiment.

FIG. 7 is a block diagram illustrating the entire configuration of a captured image recording system of a first modification. Note that, in FIG. 7, illustration of a network NW (see FIG. 2) is omitted. In a captured image recording system 1001 of the first modification, all configurations of a control unit 20 illustrated in FIG. 1 are included in a recording device 300. A camera 400 is a normal camera that does not have a configuration for calculating average image complexity of complexity of input images in a fluctuation cycle.

The recording device 300 includes an image recording unit 31 and a recording medium 32, in addition to the configurations of the control unit 20 illustrated in FIG. 1. The image recording unit 31 records encoded data transmitted from the camera 400, in the recording medium 32. An average QP detection unit 22 and a generated code amount detection unit 21 of the recording device 300 respectively detect an average quantization parameter and a generated code amount, based on the encoded data transmitted from the camera 400. A control signal from a code amount control unit 26 included in the recording device 300 is transmitted from the recording device 300 to the camera 400, and is input to a quantizer 13 of the camera 400.

Figure 8:
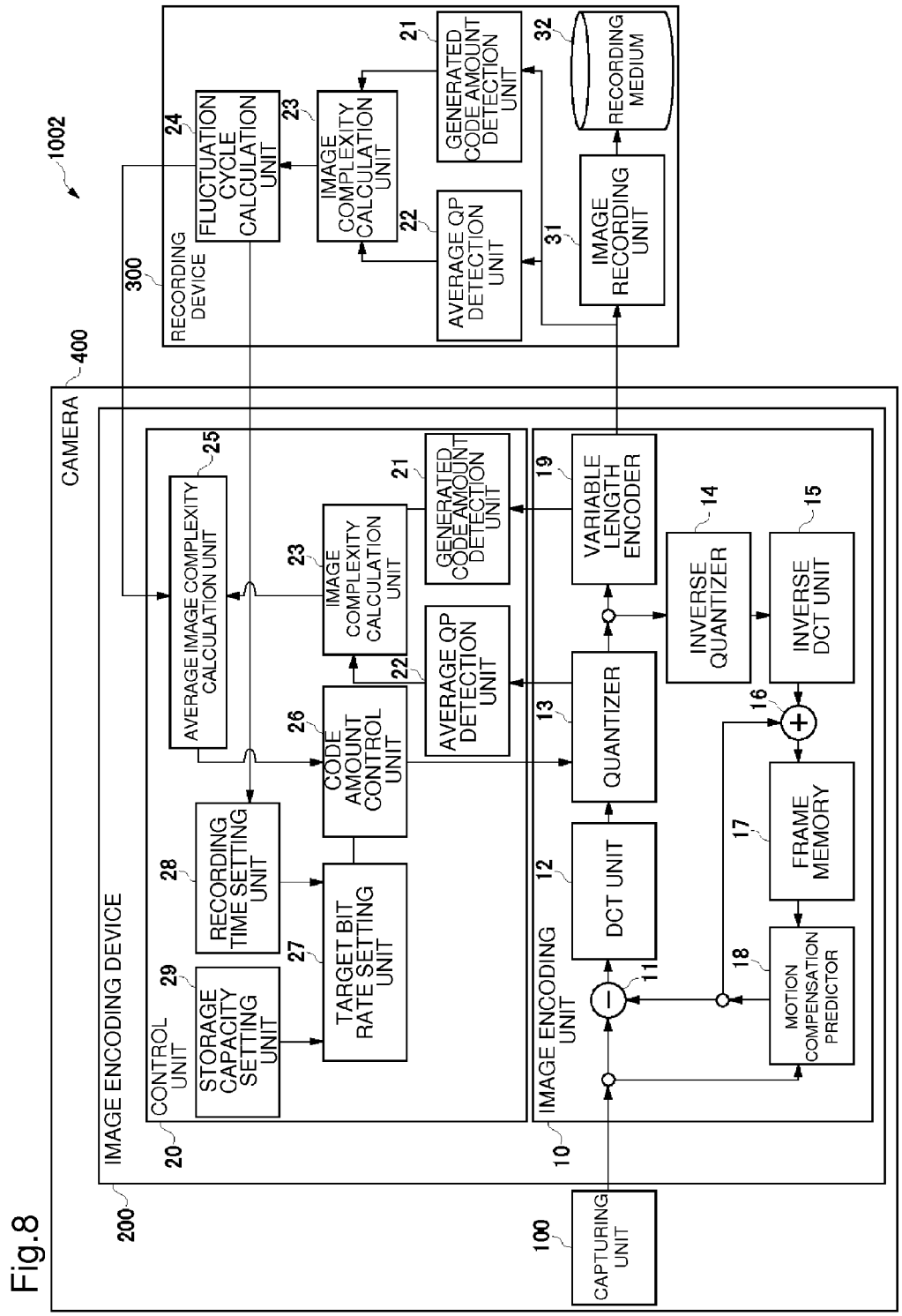
FIG. 8 is a block diagram illustrating a captured image recording system in a second modification of an embodiment.

FIG. 8 is a block diagram illustrating the entire configuration of a captured image recording system of a second modification. In a captured image recording system 1002 of the second modification, when comparing an image encoding device 200 with the example of FIG. 1, a control unit 20 of an image encoding device 200 of the captured image recording system 1002 does not include a fluctuation cycle calculation unit 24. A configuration for calculating a fluctuation cycle of image complexity is provided in a recording device 300.

The recording device 300 includes a generated code amount detection unit 21, an average QP detection unit 22, an image complexity calculation unit 23, and a fluctuation cycle calculation unit 24, as the configuration for calculating a fluctuation cycle of image complexity. Further, similarly to the first modification, the recording device 300 includes a recording medium 32, and an image recording unit 31 that records encoded data transmitted from a camera 400, in the recording medium 32.

The average QP detection unit 22 and the generated code amount detection unit 21 of the recording device 300 respectively detect an average quantization parameter and a generated code amount, based on the encoded data transmitted from the camera 400. The fluctuation cycle calculated in the fluctuation cycle calculation unit 24 of the recording device 300 is transmitted to the camera 400 through a network, and is input to a recording time setting unit 28 of the image encoding device 200.

Figure 9:
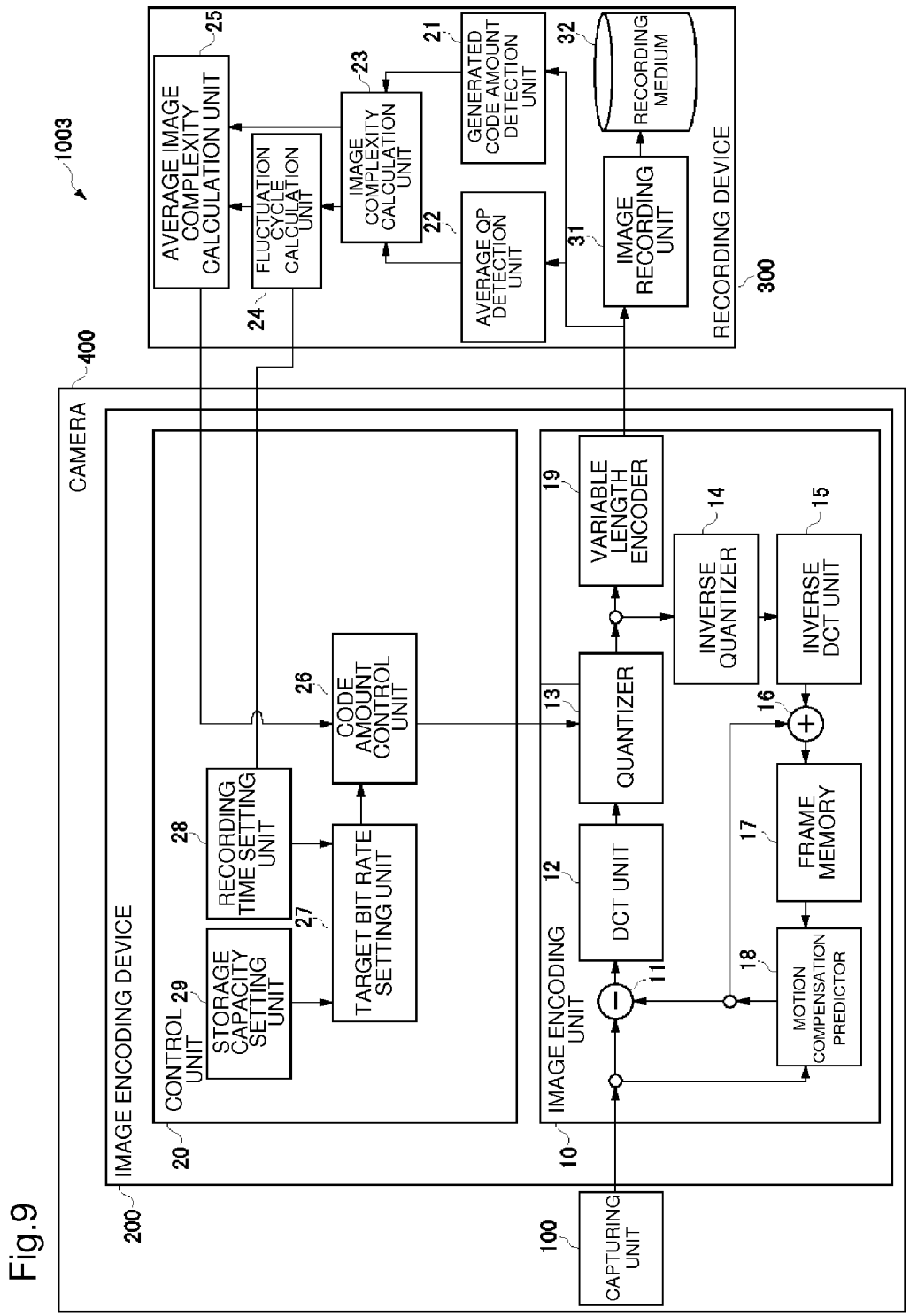
FIG. 9 is a block diagram illustrating a captured image recording system in a third modification of an embodiment.

FIG. 9 is a block diagram illustrating the entire configuration of a captured image recording system of a third modification. In a captured image recording system 1003 of the third embodiment, when comparing an image encoding device 200 with the example of FIG. 1, a control unit 20 of the image encoding device 200 of the captured image recording system 1003 does not include a generated code amount detection unit 21, an average QP detection unit 22, an image complexity calculation unit 23, a fluctuation cycle calculation unit 24, and an average image complexity calculation unit 25. Configurations for calculating a fluctuation cycle based on image complexity, and for calculating average image complexity are included in a recording device 300.

The recording device 300 includes the generated code amount detection unit 21, the average QP detection unit 22, the image complexity calculation unit 23, the fluctuation cycle calculation unit 24, and the average image complexity calculation unit 25, as the configurations for calculating a fluctuation cycle based on image complexity, and for calculating average image complexity. Further, the recording device 300 includes a recording medium 32, and an image recording unit 31 that records encoded data transmitted from a camera 400, in the recording medium 32, similarly to the first modification.

The average QP detection unit 22 and the generated code amount detection unit 21 of the recording device 300 respectively detect an average quantization parameter and a generated code amount, based on the encoded data transmitted from the camera 400. The fluctuation cycle calculated in the fluctuation cycle calculation unit 24 of the recording device 300 is transmitted to the camera 400 through a network, and is input to a recording time setting unit 28 of the image encoding device 200. The average image complexity calculated in the average image complexity calculation unit 25 of the recording device 300 is transmitted to the camera 400 through the network, and is input to a code amount control unit 26 of the image encoding device 200.

As described above, the configuration of a part of the image encoding device 200 is provided in the recording device 300, instead of in the camera 400, whereby the processing in the camera 400 is decreased and the calculation sources required for the camera 400 can be decreased, and the camera 400 can be configured to be a cheap, small, and light camera.

Favorable embodiments, which can be considered in the present moment, have been described above. However, various modifications can be made to the present embodiments, and it is intended that the appended claims include all of such modifications that fall within the true spirit and the scope of the present invention.

INDUSTRIAL APPLICABILITY

The present invention has effects to be able to control the total generated code amount of the fluctuation cycle of the complexity of the input images, and to record desired hours of the encoded data in the recording medium having a predetermined storage capacity in the VBR encoding system. The present invention is effective as an image encoding device that encodes a plurality of sequentially input images to generate a plurality of encoded image that configures video data, and the like.

REFERENCE SIGNS LIST

10 Image encoding unit
11 Subtractor
12 DCT unit
13 Quantizer
14 Inverse quantizer
15 Inverse DCT unit
16 Adder
17 Frame memory
18 Motion compensation predictor
19 Variable length encoder
20 Control unit
21 Generated code amount detection unit
22 Average QP detection unit
23 Image complexity calculation unit
24 Fluctuation cycle calculation unit
25 Average image complexity calculation unit
26 Code amount control unit
27 Target bit rate setting unit
28 Recording time setting unit
29 Storage capacity setting unit
100 Capturing unit
200 Image encoding device
300 Recording device
400 Camera
1000, 1001, 1002, and 1003 Captured image recording system

The invention claimed is:

1. An image encoding device comprising:
an image encoding unit configured to encode a plurality of sequentially input images to generate a plurality of encoded data that configures video data; and
a code amount control unit configured to control a code amount of the encoded data generated in the image encoding unit such that the code amount of the plurality of encoded data in a cycle unit becomes a predetermined value,
wherein the cycle unit is a cycle of periodic variation of the code amount of the encoded data or a cycle of periodic variation of complexity of the input images.

2. An image encoding device comprising:
an image encoding unit configured to encode a plurality of sequentially input images to generate a plurality of encoded data that configures video data; and
a code amount control unit configured to control an encoding parameter to have certain image quality in a cycle unit, and to control a code amount of the encoded data generated in the image encoding unit such that the code amount in the cycle unit becomes a predetermined value,
wherein the cycle unit is a cycle f periodic variation of the code amount of the encoded data or a cycle of periodic variation of complexity of the input images.

3. An image encoding device comprising:
an image encoding unit configured to encode a plurality of sequential input images, in which a code amount of encoded data is periodically varied, to generate a plurality of the encoded data; and a code amount control unit configured to control an encoding parameter of the image encoding unit to have certain image quality in a cycle unit, wherein the cycle unit is a cycle of periodic variation of the code amount of the encoded data or a cycle of periodic variation of complexity of the input images.

4. An image encoding device comprising:

an image encoding unit configured to encode a plurality of sequentially input images to generate a plurality of encoded data that configures video data; and a code amount control unit configured to control an encoding parameter of the encoded data generated in the image encoding unit to have certain image quality, in a cycle unit in which a code amount of the plurality of encoded data becomes constant, wherein the cycle unit is a cycle of periodic variation of the code amount of the encoded data or a cycle of periodic variation of complexity of the input images.

5. The image encoding device according to claim 1, wherein the code amount in the cycle unit is a total generated code amount or an average bit rate, in the cycle.

6. The image encoding device according to claim 1, further comprising:

an average image complexity calculation unit configured to calculate average image complexity in a fluctuation cycle of complexity of the input images, based on the plurality of encoded data, wherein the code amount control unit controls the code amount of the encoded data generated in the image encoding unit, based on the average image complexity.

7. The image encoding device according to claim 6, further comprising:

an image complexity calculation unit configured to calculate complexity of the input images, based on the encoded data; and a fluctuation cycle calculation unit configured to calculate the fluctuation cycle of the complexity calculated in the image complexity calculation unit, wherein the average image complexity calculation unit calculates the average image complexity in the fluctuation cycle calculated by the fluctuation cycle calculation unit.

8. The image encoding device according to claim 7, wherein the image complexity calculation unit calculates the complexity of the input images, based on the code amount of the encoded data.

9. The image encoding device according to claim 7, wherein the image complexity calculation unit calculates the complexity of the input images, based on the code amount of the encoded data and a quantization parameter of a quantization unit.

10. The image encoding device according to claim 7, wherein the image complexity calculation unit calculates the complexity of each one GOP of the plurality of sequentially input images, the fluctuation cycle calculation unit calculates the fluctuation cycle every time the complexity is calculated in the image complexity calculation unit, and the average image complexity calculation unit calculates the average image complexity in the fluctuation cycle every time the fluctuation cycle is calculated in the fluctuation cycle calculation unit.

11. The image encoding device according to claim 7, wherein the fluctuation cycle calculation unit calculates the fluctuation cycle at certain time intervals, and the average image complexity calculation unit calculates the average image complexity in the fluctuation cycle every time the fluctuation cycle is calculated in the fluctuation cycle calculation unit.

12. The image encoding device according to claim 6, wherein the image encoding unit includes a quantization unit and a variable length encoding unit that performs variable length encoding of data output from the quantization unit.

13. The image encoding device according to claim 12, wherein the code amount control unit controls the code amount of the encoded data by adjusting a quantization parameter in the quantization unit.

14. The image encoding device according to claim 6, wherein the code amount control unit controls the code amount of the encoded data, based on the average image complexity and a set target code amount in the fluctuation cycle.

15. The image encoding device according to claim 6, wherein the average image complexity calculation unit calculates the average image complexity, using an operation time of the image encoding device in one day, as the fluctuation cycle.

16. The image encoding device according to claim 6, wherein the average image complexity calculation unit calculates the average image complexity, using an operation time of the image encoding device in one week, as the fluctuation cycle.

17. A captured image recording system including an imaging device and an image recording device, comprising:

a capturing unit provided in the imaging device, and configured to capture an object to generate an image;

an image encoding unit provided in the imaging device, and configured to encode a plurality of input images generated in the imaging unit and sequentially input, to generate a plurality of encoded data that configures video data;

a code amount control unit configured to control a code amount of the encoded data generated in the image encoding unit such that the code amount of the plurality of encoded data in a cycle unit becomes a predetermined value, wherein the cycle unit is a cycle of periodic variation of the code amount of the encoded data or a cycle of periodic variation of complexity of the input images; and a recording medium provided in the image recording device, and having a predetermined storage capacity for recording the encoded data generated in the image encoding unit.

18. The captured image recording system according to claim 17, further comprising:

an image complexity calculation unit configured to calculate complexity of the input images, based on the encoded data;

a fluctuation cycle calculation unit configured to calculate a fluctuation cycle of the complexity calculated in the image complexity calculation unit; and an average image complexity calculation unit configured to calculate average image complexity in the fluctuation cycle calculated in the fluctuation cycle calculation unit, wherein the code amount control unit controls the code amount of the encoded data generated in the image encoding unit, based on the average image complexity.

19. The captured image recording system according to claim 18, wherein the image complexity calculation unit and the fluctuation cycle calculation unit are provided in the image recording device.

20. The captured image recording system according to claim 18, wherein the average image complexity calculation unit is provided in the image recording device.

21. An imaging device comprising:
a capturing unit configured to capture an object to generate an image;
an image encoding unit configured to encode a plurality of input images generated in the capturing unit and sequentially input, to generate a plurality of encoded data that configures video data; and
a code amount control unit configured to control a code amount of the encoded data generated in the image encoding unit such that the code amount of the plurality of encoded data in a cycle unit becomes a predetermined value,
wherein the cycle unit is a cycle of periodic variation of the code amount of the encoded data or a cycle of periodic variation of complexity of the input images.

22. A method of encoding an image comprising:
a step of encoding a plurality of sequentially input images to generate a plurality of encoded data that configured video data; and
a code amount control step of controlling a code amount of the encoded data generated in the step of encoding images such that the code amount of the plurality of encoded data in a cycle unit becomes a predetermined value,
wherein the cycle unit is a cycle of periodic variation of the code amount of the encoded data or a cycle of periodic variation of complexity of the input images.

23. A non-transitory computer-readable medium storing an image encoding program which, when executed by a computer, causes the computer to:
encode a plurality of sequentially input images to generate a plurality of encoded data that configures video data; and
control a code amount of the encoded data generated in the image encoding unit such that the code amount of the plurality of encoded data in a cycle unit becomes a predetermined value,
wherein the cycle unit is a cycle of periodic variation of the code amount of the encoded data or a cycle of periodic variation of complexity of the input images.

* * * * *